US011860988B1

(12) United States Patent
Baker et al.

(10) Patent No.: US 11,860,988 B1
(45) Date of Patent: Jan. 2, 2024

(54) SMART RING FOR FINANCIAL TRANSACTIONS

(71) Applicant: UIPCO, LLC, San Antonio, TX (US)

(72) Inventors: Kelly Q. Baker, San Antonio, TX (US); William Preston Culbertson, II, Plant City, FL (US); Will Kerns Maney, Jr., San Antonio, TX (US); Gregory David Hansen, San Antonio, TX (US); Jerry John Maestas, Trophy Club, TX (US); Oscar Guerra, San Antonio, TX (US); Gregory Brian Meyer, San Antonio, TX (US); Ana Maldonado, San Antonio, TX (US); Michelle Susan Croak, Chicago, IL (US); Andre Rene Buentello, San Antonio, TX (US); Stacy Callaway Huggar, San Antonio, TX (US); Jose L. Romero, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 396 days.

(21) Appl. No.: 17/006,043

(22) Filed: Aug. 28, 2020

Related U.S. Application Data

(60) Provisional application No. 62/893,926, filed on Aug. 30, 2019.

(51) Int. Cl.
  *G06F 21/00* (2013.01)
  *G06F 21/35* (2013.01)
  (Continued)

(52) U.S. Cl.
  CPC .............. *G06F 21/35* (2013.01); *G06F 1/163* (2013.01); *G06F 3/017* (2013.01); *G06F 21/32* (2013.01);
  (Continued)

(58) Field of Classification Search
  CPC .......... G06F 21/35; G06F 1/163; G06F 3/017; G06F 21/32; G06F 2221/2113;
  (Continued)

(56) References Cited

U.S. PATENT DOCUMENTS 10,325,083 B2 *  6/2019  Dadu ...................... G06F 21/32
10,635,173 B2 *  4/2020  Lim ..................... H04L 63/0861
(Continued)

*Primary Examiner* — Jeffrey C Pwu
*Assistant Examiner* — William A Corum, Jr.
(74) *Attorney, Agent, or Firm* — Plumsea Law Group, LLC

(57) ABSTRACT

A method and system for a one-time authentication interaction to conduct electronic financial transactions using a wearable smart ring device is described. In one embodiment, a method includes detecting, by a mobile device, that a wearable smart ring device is being worn by a user. The method also includes receiving, by the mobile device, authentication information associated with the user, and comparing the received authentication information with stored authentication information associated with the user. Upon determining that the received authentication information matches the stored authentication information, the wearable smart ring device is authorized to conduct electronic financial transactions. Additionally, the wearable smart ring device remains authorized to conduct electronic financial transactions as long as it is worn by the user. Once removed from the user's finger, the wearable smart ring device is de-authorized.

20 Claims, 9 Drawing Sheets

(51) Int. Cl.
*G06F 21/32* (2013.01)
*G06Q 20/40* (2012.01)
*G06Q 20/32* (2012.01)
*G06F 3/01* (2006.01)
*G06F 1/16* (2006.01)
*G06V 40/16* (2022.01)

(52) U.S. Cl.
CPC ....... *G06Q 20/321* (2020.05); *G06Q 20/3278* (2013.01); *G06Q 20/40145* (2013.01); *G06V 40/172* (2022.01); *G06F 2221/2113* (2013.01)

(58) Field of Classification Search
CPC ............. G06Q 20/321; G06Q 20/3278; G06Q 20/40145; G06V 40/172
See application file for complete search history.

(56) References Cited

U.S. PATENT DOCUMENTS

| | | | |
|---|---|---|---|
| 11,068,089 B1* | 7/2021 | Kim | G06V 40/1318 |
| 2015/0286813 A1* | 10/2015 | Jakobsson | G06F 21/35 |
| | | | 726/9 |
| 2015/0288687 A1* | 10/2015 | Heshmati | H04L 67/10 |
| | | | 726/7 |
| 2016/0086176 A1* | 3/2016 | Silva Pinto | H04W 12/106 |
| | | | 705/44 |
| 2016/0267265 A1* | 9/2016 | Waltermann | G06F 3/017 |
| 2016/0350581 A1* | 12/2016 | Manuel | G06V 40/11 |
| 2017/0061424 A1* | 3/2017 | Dent | G06Q 20/3224 |
| 2017/0068956 A1* | 3/2017 | Jones | G06Q 20/367 |
| 2018/0103030 A1* | 4/2018 | Einberg | G06F 1/163 |
| 2021/0097520 A1* | 4/2021 | Adari | G06F 21/6209 |

\* cited by examiner

SMART RING FOR FINANCIAL TRANSACTIONS

CROSS-REFERENCE TO RELATED APPLICATION

This application claims the benefit of U.S. Provisional Patent Application Ser. No. 62/893,926 filed on Aug. 30, 2019 and titled "Smart Ring for Financial Transactions", the disclosure of which is incorporated by reference in its entirety.

BACKGROUND

The present embodiments related to electronic financial transactions in general, and more particularly, to methods and systems for authenticating a user for electronic financial transactions.

Electronic payments are moving away from conventional magnetic stripe cards, such as credit cards or debit cards, to a variety of different contactless or near-field-communication (NFC) enabled devices. These contactless or NFC-enabled devices use short distance communications between the NFC-enabled device and a point-of-sale (POS) terminal or other similar payment receiving device that are physically separated to authenticate an electronic financial transaction. However, the availability of personal and financial information on these NFC-enabled devices makes them a target for being stolen or hacked, allowing a criminal to make purchases that are charged to the owner of the stolen or hacked device.

Accordingly, many NFC-enabled device owners may be hesitant to use their device to its fullest capabilities. Additionally, some merchants may be reluctant to accept these types of electronic financial transactions out of concerns that they may not be legitimate. There is a need in the art for a system and method that addresses these shortcomings discussed above.

SUMMARY

In one aspect, a method for a one-time authentication interaction to conduct electronic financial transactions is provided. The method includes detecting, by a mobile device, that a wearable smart ring device is being worn by a user. The method also includes receiving, by the mobile device, authentication information associated with the user, and comparing, by the mobile device, the received authentication information with stored authentication information associated with the user. Upon determining that the received authentication information matches the stored authentication information, the method includes authenticating the wearable smart ring device to conduct electronic financial transactions.

In another aspect, a method for conducting electronic financial transactions using a wearable smart ring device is provided. The method includes receiving, by a mobile device, authentication information associated with a user of a wearable smart ring device in communication with the wearable smart ring device. The method also includes authenticating, by the mobile device, the wearable smart ring device for conducting electronic financial transactions. The method further includes using the wearable smart ring device to conduct one or more electronic financial transactions, wherein the wearable smart ring device remains authenticated for conducting subsequent electronic financial transactions until the wearable smart ring device is removed from a finger of the user.

In another aspect, a system for conducting electronic financial transactions using a wearable smart ring device is provided. The system includes a wearable smart ring device including at least one of a near-field communication (NFC) sensor or a radio frequency identification (RFID) sensor and a short-range communication sensor. The system also includes a mobile device including a communication module configured to permit the mobile device to communicate with the short-range communication sensor of the wearable device. The mobile device is configured to receive authentication information associated with a user of the wearable smart ring device to authenticate the wearable smart ring device for conducting electronic financial transactions. The wearable smart ring device remains authenticated for conducting subsequent electronic financial transactions until the wearable smart ring device is removed from a finger of the user.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

A wearable smart ring device and a method of using the wearable smart ring device for an electronic financial transaction are provided.

Figure 1:
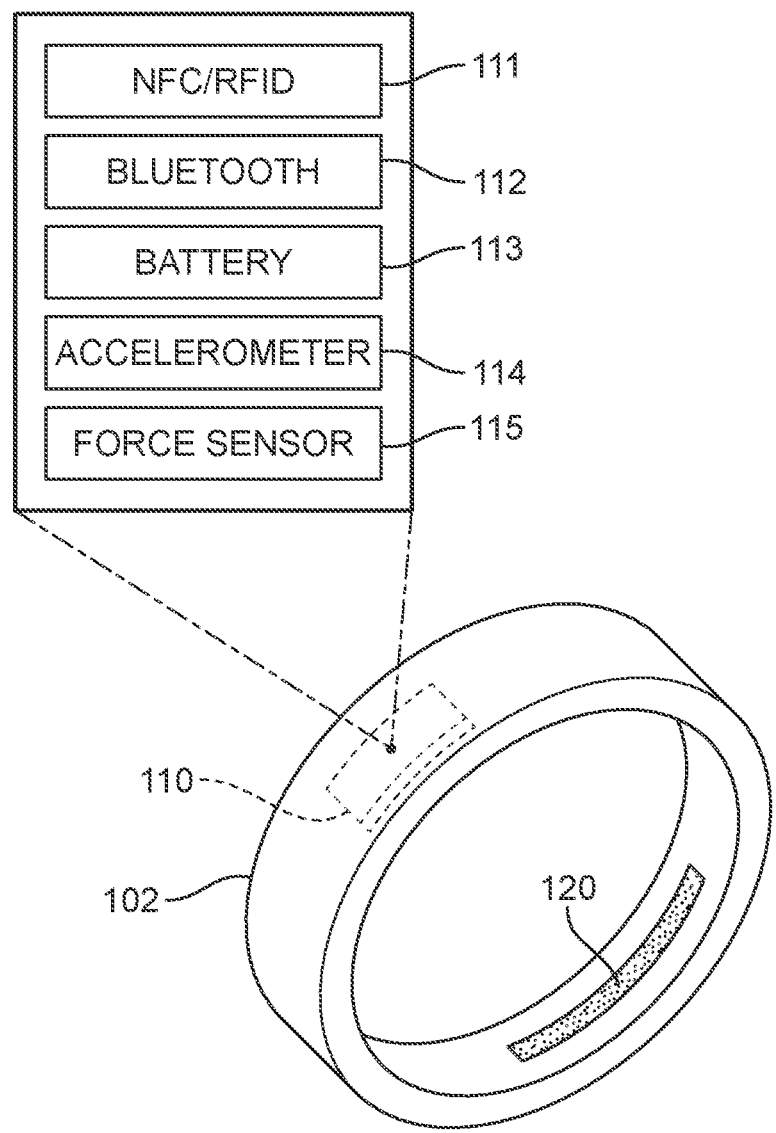
FIG. 1 is a schematic view of an example embodiment of a wearable smart ring device.

FIG. 1 illustrates an example embodiment of a wearable smart ring device 102. In an example embodiment, wearable smart ring device 102 (also referred to herein as "smart ring 102") includes components configured to enable electronic financial transactions or mobile payments. For example, electronic financial transactions or mobile payments can include purchases made at a merchant using a POS terminal or other payment receiving device, as well as payments between two or more individuals, or other types of transactions that use electronic payment methods to send and/or receive money or credits.

In some embodiments, smart ring 102 may have a circular or annular shape configured to be worn on a finger of a user. In an example embodiment, smart ring 102 includes a plurality of components 110 that are configured to permit smart ring 102 to communicate with other devices and/or to conduct electronic financial transactions using smart ring 102. In this embodiment, plurality of components 110 includes at least an NFC or Radio Frequency Identification (RFID) sensor 111 that provides smart ring 102 with contactless payment capabilities. Plurality of components 110 also includes a Bluetooth sensor 112 or other type of short-range wireless communication sensor, such as a sensor employing WiFi or similar wireless technology, and a battery 113 or other power source that is configured to supply electrical power to smart ring 102.

In an example embodiment, plurality of components 110 may also include one or more sensors that are configured to measure parameters associated with movement of smart ring 102 by the user. For example, in this embodiment, plurality of components 110 of smart ring 102 include an accelerometer 114 configured to measure acceleration values and a force sensor 115 configured to measure force values. In some embodiments, accelerometer 114 and/or force sensor 115 may be used to measure parameters, such as acceleration, speed, orientation, force, etc., associated with movements of a hand or finger of a user wearing smart ring 102.

In some embodiments, smart ring 102 may also include components configured to detect or capture information associated with unique biological traits of a user to identify, verify, and authenticate the user wearing smart ring 102. In an example embodiment, smart ring 102 includes a biometric sensor 120 that is configured to obtain biometric information associated with a user wearing smart ring 102. For example, biometric sensor 120 may be a fingerprint sensor, a pulse rate sensor, a vein sensor, or other type of sensor that is configured to measure or sense biometric information associated with a user wearing smart ring 102 to verify the identity of the user.

In this embodiment, biometric sensor 120 is a fingerprint sensor that is disposed on a portion of an inside surface of smart ring 102 so that a user's fingerprint is scanned or read by the action of the user putting smart ring 102 onto their finger. In some embodiments, biometric sensor 120 or another sensor, such as a light sensitive or photocell sensor, may be used to detect when a user puts on smart ring 102 and when a user removes smart ring 102.

Figure 2:
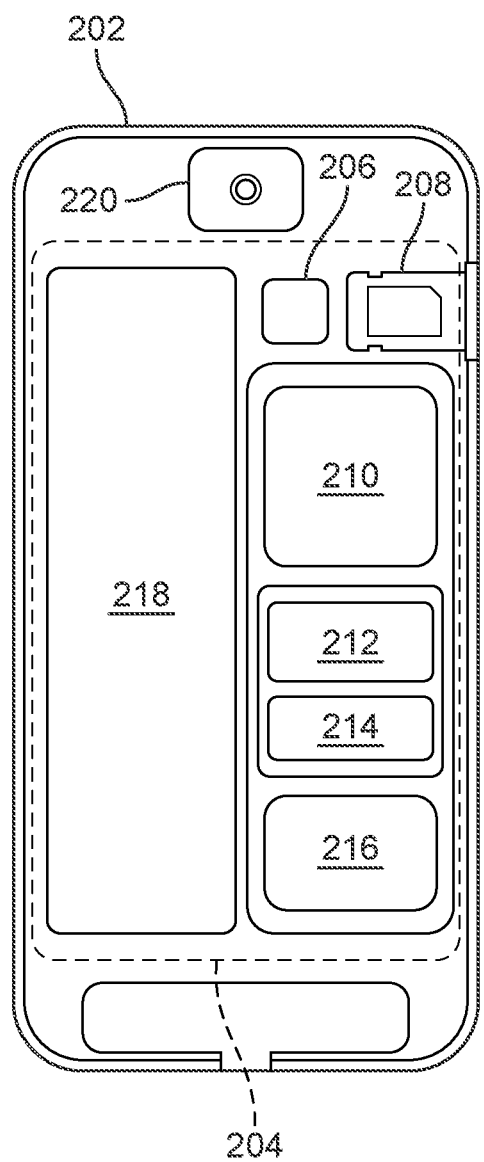
FIG. 2 is a schematic view of an example embodiment of a mobile device.

Referring now to FIG. 2, an example embodiment of a mobile device 202 that may be used with smart ring 102 to conduct an electronic financial transaction is shown. In an example embodiment, mobile device 202 is associated with or belongs to the user wearing smart ring 102 and is used together with smart ring 102 to conduct an electronic financial transaction. In particular, mobile device 202 may be used by the user wearing smart ring 102 to authenticate smart ring 102 for conducting electronic financial transactions, such as making contactless payments at a POS terminal or similar transactions as described above.

In this embodiment, mobile device 202 is a cellphone or smart phone. Mobile device 202 includes a plurality of components typically found in a cellphone or smart phone, including, as shown in FIG. 2, at least a display 204, a global positioning system (GPS) sensor 206, a subscriber identity module or subscriber identification module (SIM) 208, a processor 210, a communication module 212 (e.g., for enabling various wireless network communications, such as via code division multiple access (CDMA) and/or global system for mobile communications (GSM) networks, as well as one or more of Bluetooth, WiFi, and/or other wireless communication technologies), a memory 214, a connection module 216 (e.g., to enable wired connections, such as via universal serial bus (USB), Lightning connector, etc.), and a battery 218. In an example embodiment, mobile device 202 may also include at least one camera 220 or other image sensor. It should understood that mobile device 202 and its respective components described above is merely exemplary and any type of suitable mobile device may be used to authenticate smart ring 102 as described herein. For example, in other embodiments, mobile device 202 may be a tablet or laptop computer.

Figure 3:
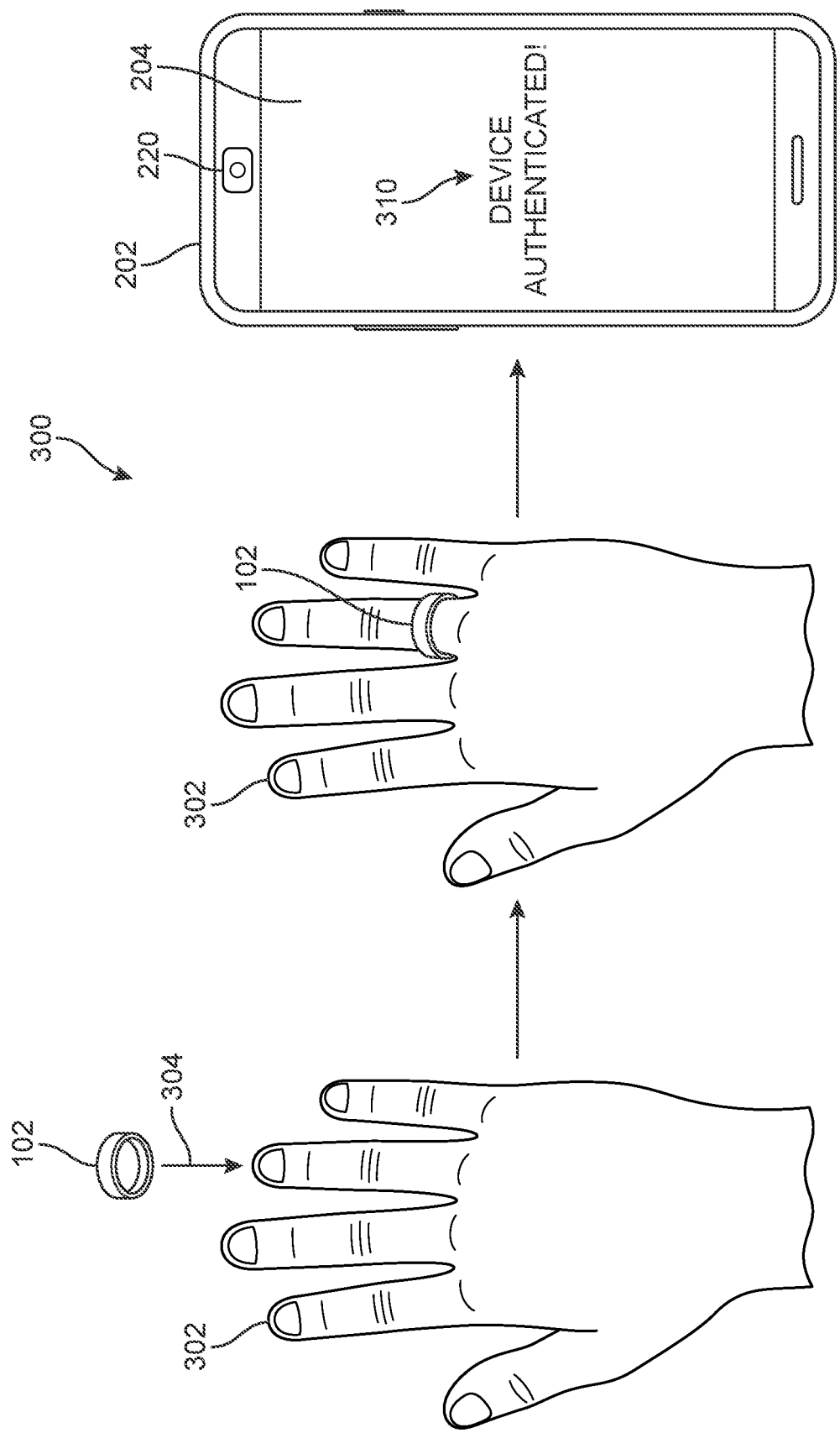
FIG. 3 is a schematic overview of an example embodiment of a wearable smart ring device being authenticated.

According to the techniques described herein, smart ring 102 may be authorized to conduct electronic financial transactions via a one-time authentication interaction with mobile device 202 that remains valid until smart ring 102 is removed from the user's finger. That is, the authentication provided to smart ring 102 via the one-time authentication interaction with mobile device 202 is durable such that smart ring 102 continues to be authenticated for an indefinite period of time until it is removed from the user's finger. Referring now to FIG. 3, an example embodiment of wearable smart ring device 102 is shown being authenticated. In one embodiment, a one-time authentication interaction 300 between smart ring 102 and mobile device 202 is used to authenticate smart ring 102 for conducting electronic financial transactions.

In this embodiment, a user 302 is shown placing smart ring 102 on a finger. For example, as shown in FIG. 3, user 302 moves smart ring 102 in a first direction 304 to put smart ring 102 onto a finger of user 302. In this embodiment, smart ring 102 is worn by user 302 on the ring finger (i.e. the fourth digit of the hand of user 302) between the middle finger and the little finger (i.e., between the third and fifth digits of the hand). It should be understood, however, that smart ring 102 may be worn by a user (e.g., user 302) on any of the digits on the user's hand, including any finger and/or thumb.

Upon placing smart ring 102 on the finger of user 302, smart ring 102 may communicate with another device as part of one-time authentication interaction 300. In this embodiment, smart ring 102 is authenticated using mobile device 202 as part of one-time authentication interaction 300. Mobile device 202 authenticates smart ring 102 and may provide an authentication message 310 on display 204 of mobile device 202 to inform user 302 that smart ring 102 has been authenticated and can be used to conduct electronic financial transactions.

In some embodiments, smart ring 102 may be authenticated using mobile device 202 prior to placing smart ring 102 on the finger of user 302. For example, user 302 may bring smart ring 102 within proximity of mobile device 202, such as within the range of short-range communication technology (e.g., Bluetooth or NFC/RFID), to trigger one-time authentication interaction 300.

As described above, upon completion of one-time authentication interaction 300, smart ring 102 may be used by user 302 to conduct one or more electronic financial transactions for as long as smart ring 102 remains on the finger of user 302. That is, until smart ring 102 is removed, which may be sensed by one or more of the sensors included in smart ring 102, such as accelerometer 114, biometric sensor 120, or a light-detecting sensor, smart ring 102 will continue to be authorized for conducting electronic financial transactions. With this arrangement, user 302 is not inconvenienced by repeated requests for authorization every time that they conduct another transaction using smart ring 102.

Additionally, because one-time authentication interaction 300 is initiated upon detection of placing smart ring 102 on the finger of user 302, smart ring 102 is only authenticated while physically being worn by user 302. In this manner, smart ring 102 may be protected from being stolen or used by people other than user 302.

Figure 4:
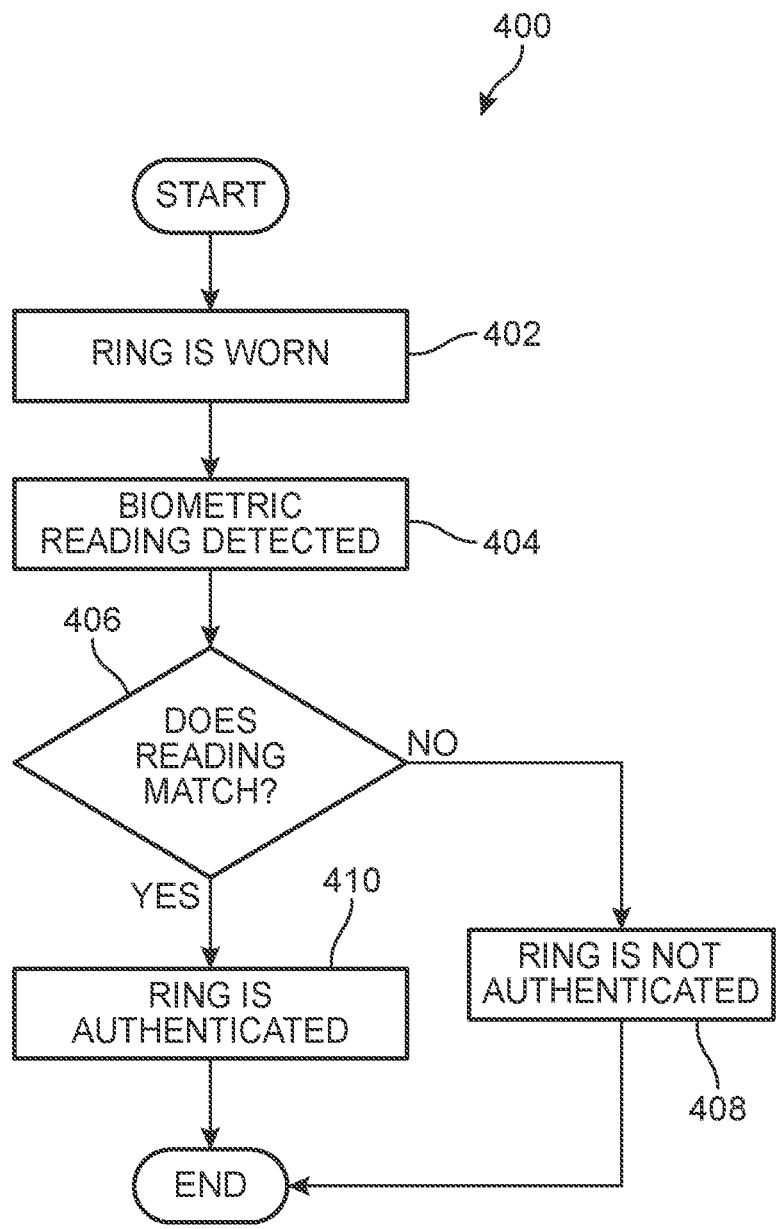
FIG. 4 is a flowchart of an example embodiment of a process for authenticating a wearable smart ring device.

Referring now FIG. 4, a flowchart of an example embodiment of an authentication process 400 for authenticating wearable smart ring device 102 is shown. In some embodiments, authentication process 400 may be performed by mobile device 202 as part of one-time authentication interaction 300, described above. Additionally, in some embodiments, authentication process 400 may also include a preliminary operation where the wearable smart ring device is initially paired or connected with a mobile device. For example, the first time user 302 wears smart ring 102, user 302 may use Bluetooth or another short-range wireless communication technology to pair or connect smart ring 102 with mobile device 202. Once smart ring 102 and mobile device 202 have been initially paired or connected, the devices may automatically pair or connect with each other for subsequent interactions.

In this embodiment, authentication process 400 begins with an operation 402, where a wearable smart ring device (e.g., smart ring 102) is worn by a user (e.g., user 302). If the wearable smart ring device and the user's mobile device have already been paired, as described above, then upon initiation of operation 402, the smart ring and the mobile device may communicate with each other to establish a connection. For example, via Bluetooth sensor 112 of smart ring 102 and communication module 212 of mobile device 202. If the wearable smart ring device and the user's mobile device have not already been paired, then upon initiation of operation 402, authentication process 400 may include an additional operation where the smart ring and the mobile device are initially paired or connected so that the devices may communicate with each other.

Next, authentication process 400 includes an operation 404. At operation 404, a biometric reading is detected. For example, as described above, smart ring 102 may include biometric sensor 120 that performs a biometric reading upon placing smart ring 102 onto a finger of user 302. Operation 404 may include comparing the biometric reading to saved or stored biometric information associated with the user (e.g., user 302). In various embodiments, the stored or saved biometric information may be stored or saved on the smart ring (e.g., smart ring 102), on the mobile device (e.g., mobile device 202), or both.

At an operation 406, whether or not the biometric reading matches the stored or saved biometric information associated with the user is determined. Upon determining at operation 406 that the biometric reading does not match, then authentication process 400 proceeds to an operation 408 where the smart ring is not authenticated. Upon failure to authenticate the smart ring, authentication process 400 ends.

Upon determining at operation 406 that the biometric reading from operation 404 matches the stored or saved biometric information associated with the user, then authentication process 400 proceeds to an operation 410. At operation 410, the smart ring is authenticated and authentication process 400 ends. Upon successful completion of authentication process 400, the user (e.g., user 302) may use the authenticated smart ring (e.g., smart ring 102) to conduct one or more electronic financial transactions. According to the techniques described herein, the authenticated smart ring 102 remains authenticated for conducting subsequent electronic financial transactions until such time as smart ring 102 is removed from the finger of user 302. With this arrangement, any number of secure electronic financial transactions may be conducted using the authenticated smart ring after completion of the one-time authentication process 400. As a result, inconveniences to the user due to repeated authorizations can be minimized.

Figure 5:
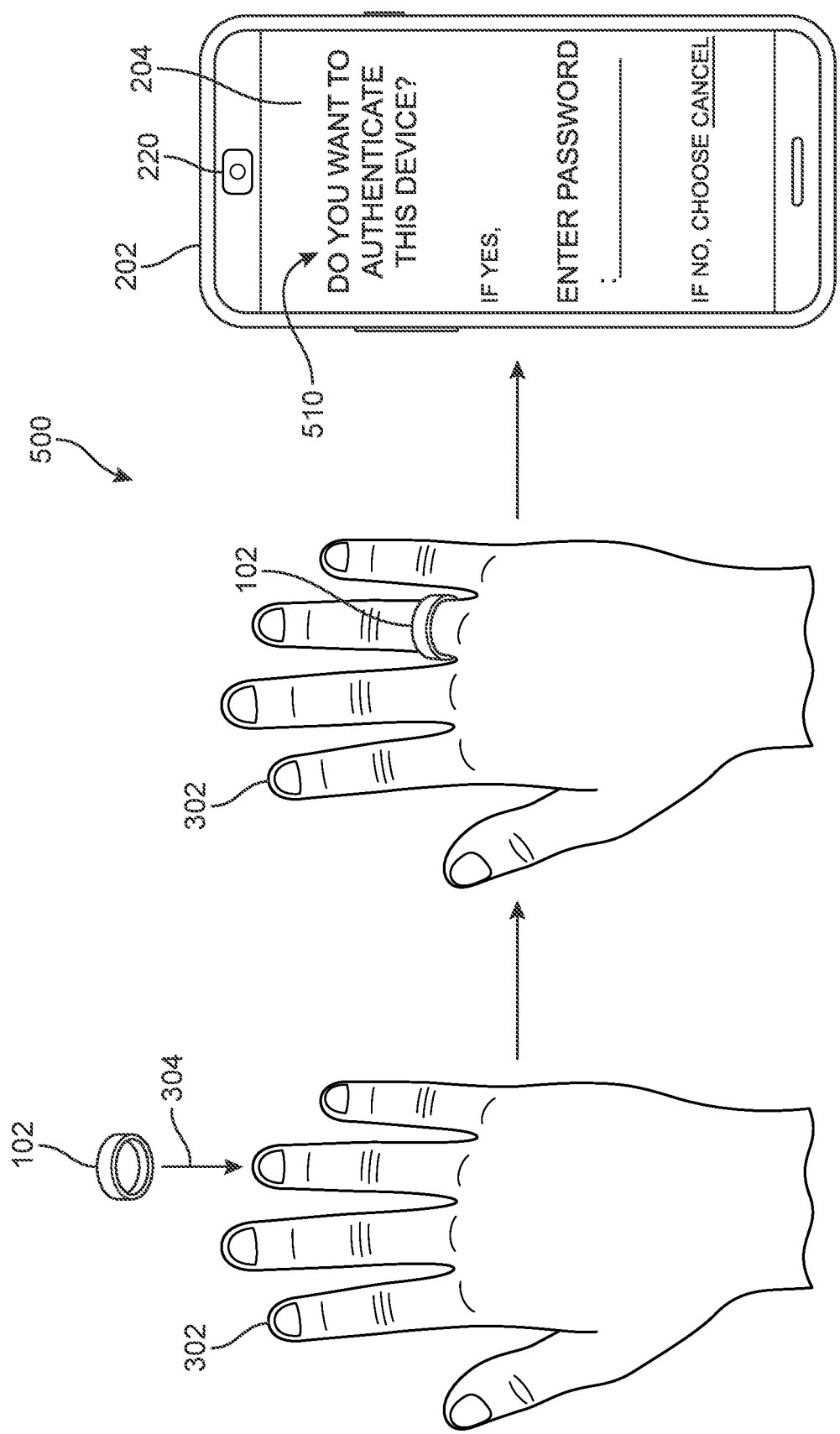
FIG. 5 is a schematic overview of an alternate embodiment of a wearable smart ring device being authenticated.

Referring now to FIG. 5, an alternate embodiment of wearable smart ring device being authenticated is shown. In one embodiment, a one-time authentication interaction 500 between smart ring 102 and mobile device 202 is used to authenticate smart ring 102 for conducting electronic financial transactions. In this embodiment, user 302 is shown moving smart ring 102 in first direction 304 to put smart ring 102 onto a finger of user 302. Upon placing smart ring 102 on the finger of user 302, smart ring 102 may communicate with another device as part of one-time authentication interaction 500. In this embodiment, an option to authenticate smart ring 102 may be selected using mobile device 202. As shown in FIG. 5, an authentication option message 510 appears on display 204 of mobile device 202 to provide user 302 with ability to authenticate smart ring 102.

In this embodiment, authentication of smart ring 102 is not performed automatically upon placing smart ring 102 on the finger of user 302. Instead, user 302 has the choice, via authentication option message 510 to choose whether or not to authenticate smart ring 102. In some cases, user 302 may want to wear smart ring 102 without the ability to conduct electronic financial transactions. In such cases, authentication option message 510 on mobile device 202 allows user 302 to decline one-time authentication interaction 500. Accordingly, user 302 may wear smart ring 102, and use other functionalities of smart ring 102, without the ability to conduct electronic financial transactions using smart ring 102.

If user 302 does want to authenticate smart ring 102 via one-time authentication interaction 500, then, in response to authentication option message 510 on mobile device 202, user 302 may enter suitable authentication information. In this embodiment, the authentication information provided in response to authentication option message 510 on mobile device 202 may take one or more of a variety of forms. For example, the authentication information can include a password entered via display 204 of mobile device 202, a facial or iris recognition scan obtained via camera 220 of mobile device 202, a pattern or sequence based code entered via touch screen display 204 of mobile device 202, voice recognition via a microphone of mobile device 202, and/or a gesture-based authentication recognized using one or more sensors of smart ring 102 (e.g., accelerometer 114 and/or force sensor 115) or mobile device 202.

As described above, upon completion of one-time authentication interaction 500, smart ring 102 may be used by user 302 to conduct one or more electronic financial transactions for as long as smart ring 102 remains on the finger of user 302. With this arrangement, user 302 is not inconvenienced by repeated requests for authorization every time that they conduct a transaction using smart ring 102.

Figure 6:
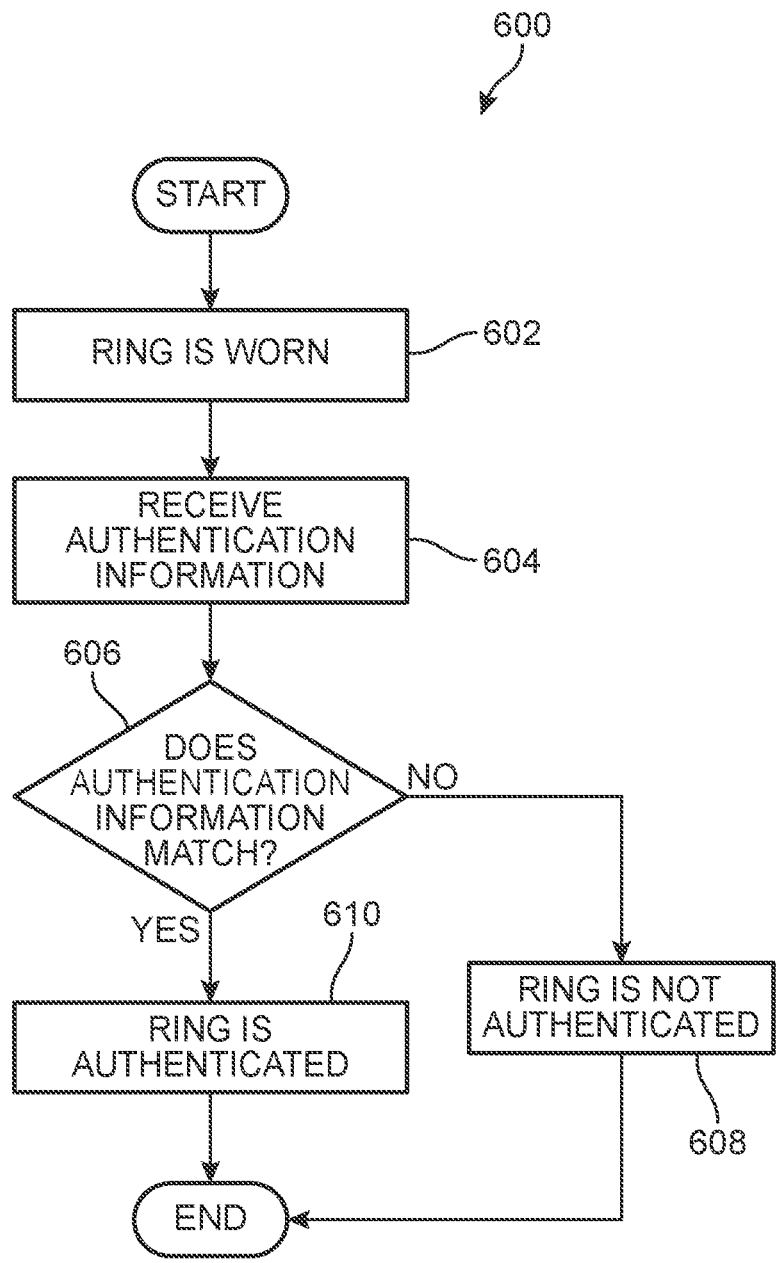
FIG. 6 is a flowchart of an alternate embodiment of a process for authenticating a wearable smart ring device.

Referring now to FIG. 6, a flowchart of an alternate embodiment of an authentication process 600 for authenticating wearable smart ring device 102 is shown. In some embodiments, authentication process 600 may be performed by mobile device 202 as part of one-time authentication interaction 500, described above. Additionally, in some embodiments, authentication process 500 may also include a preliminary operation where the wearable smart ring device is initially paired or connected with a mobile device, as described above in reference to authentication process 400.

In this embodiment, authentication process 600 begins with an operation 602, where a wearable smart ring device (e.g., smart ring 102) is worn by a user (e.g., user 302). If the wearable smart ring device and the user's mobile device have already been paired, as described above, then upon initiation of operation 602, the smart ring and the mobile device may communicate with each other to establish a connection (e.g., via Bluetooth sensor 112 of smart ring 102 and communication module 212 of mobile device 202). If the wearable smart ring device and the user's mobile device have not already been paired, then upon initiation of operation 602, authentication process 600 may include an additional operation where the smart ring and the mobile device are initially paired or connected so that the devices may communicate with each other, as described above.

Next, authentication process 600 includes an operation 604. At operation 604, authentication information associated with the user is received by the mobile device. For example, any of the forms of authentication described above may be received by mobile device 202 at operation 604, including, but not limited to: biometric information from biometric sensor 102, a password entered via display 204 of mobile device 202, a facial or iris recognition scan obtained via camera 220 of mobile device 202, a pattern or sequence based code entered via touch screen display 204 of mobile device 202, voice recognition via a microphone of mobile device 202, and/or a gesture-based authentication recognized using one or more sensors of smart ring 102 (e.g., accelerometer 114 and/or force sensor 115) or mobile device 202, as well as any other suitable form of authentication to verify the identity of user 302.

Operation 604 includes comparing the received authentication information to saved or stored authentication information associated with the user (e.g., user 302). In various embodiments, the stored or saved authentication information may be stored or saved on the smart ring (e.g., smart ring 102), on the mobile device (e.g., mobile device 202), or both. Additionally, the stored or saved authentication information may be appropriately encrypted or protected on the device(s) to prevent unauthorized access or hacking of the stored or saved authentication information.

At an operation 606, whether or not the received authentication information matches the stored or saved authentication information associated with the user is determined. Upon determining at operation 606 that the received authentication information does not match, then authentication process 600 proceeds to an operation 608 where the smart ring is not authenticated. Upon failure to authenticate the smart ring, authentication process 600 ends.

Upon determining at operation 606 that the received authentication information from operation 604 matches the stored or saved authentication information associated with the user, then authentication process 600 proceeds to an operation 610. At operation 610, the smart ring is authenticated and authentication process 600 ends. Upon successful completion of authentication process 600, the user (e.g., user 302) may use the authenticated smart ring (e.g., smart ring 102) to conduct one or more electronic financial transactions. According to the techniques described herein, the authenticated smart ring 102 remains authenticated for conducting subsequent electronic financial transactions until such time as smart ring 102 is removed from the finger of user 302. With this arrangement, any number of secure electronic financial transactions may be conducted using the authenticated smart ring after completion of the one-time authentication process 600. As a result, inconveniences to the user due to repeated authorizations can be minimized.

Additionally, in some embodiments, authentication process 600 may include two-factor authorization. For example, at operation 604 of authentication process 600, described above, mobile device 202 may receive two different forms of authentication to perform two-factor authorization. One form of authentication may include biometric information associated with the user, such as that obtained using biometric sensor 120 on smart ring 102, and another form of authentication may include at least one other form of authentication, such as a password, a facial or iris recognition scan, a pattern or sequence based code, voice recognition, and/or a gesture-based authentication, as described above, or any other suitable form of authentication. With this arrangement, additional security may be provided to smart ring 102 as part of authentication process 600.

Figure 7:
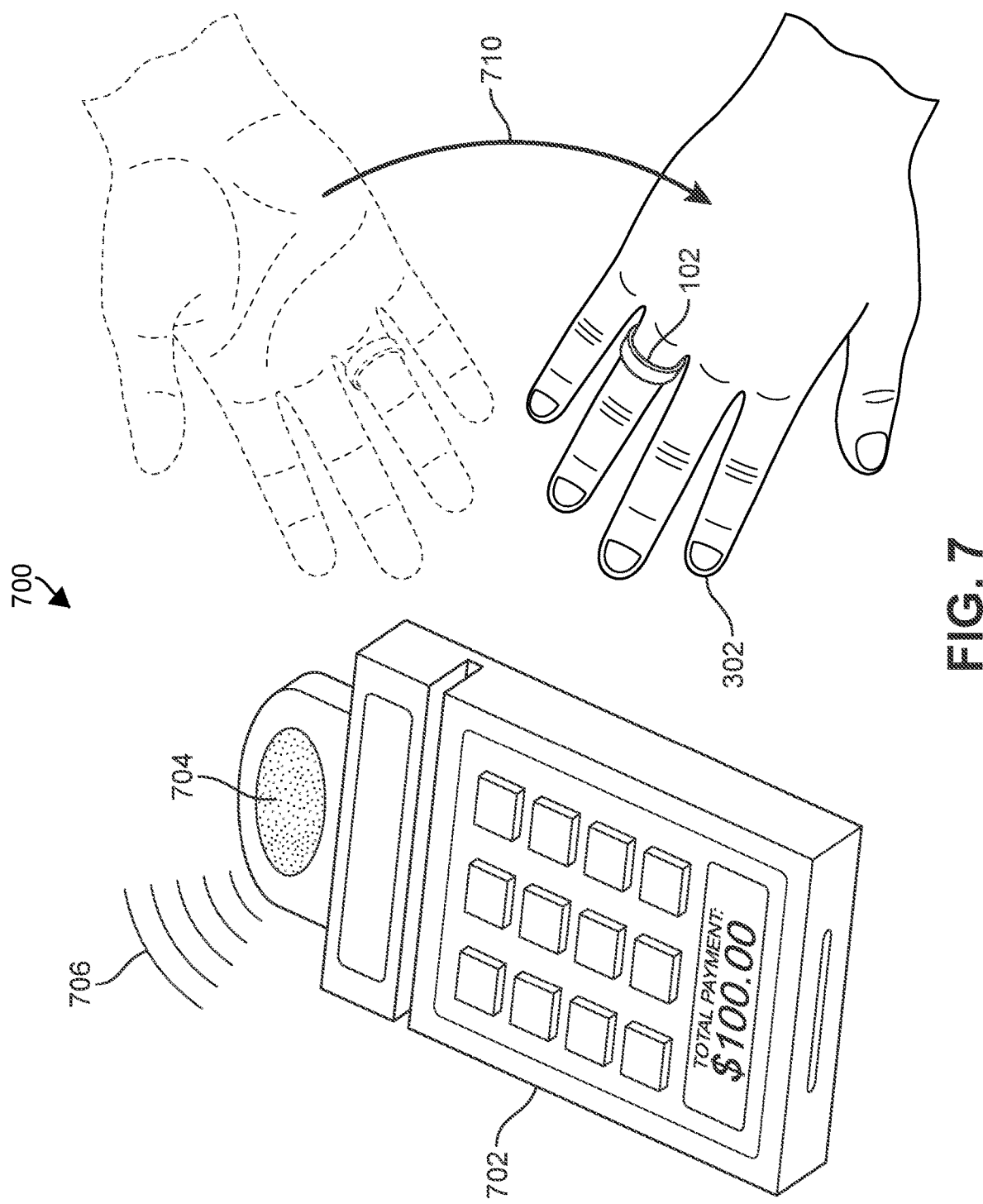
FIG. 7 is a representational view of an example embodiment of a gesture used with a wearable smart ring device.

Referring now to FIG. 7, an example embodiment of an electronic financial transaction 700 using wearable smart ring device 102 is shown. In an example embodiment, once smart ring 102 has been authenticated (e.g., according to authentication process 400, 600), user 302 may use smart ring 102 to conduct one or more electronic financial transactions. In this embodiment, electronic financial transaction 700 is representative of one of the many electronic financial transactions that user 302 may conduct using authenticated smart ring 102.

In this embodiment, a payment device 702 is provided, for example, by a merchant or business, for receiving payment for goods or services. In one embodiment, payment device 702 may be a POS terminal or other payment receiving device. Payment device 702 includes a device reader 704 that is configured to use a wireless signal 706 to conduct electronic financial transaction 700 with smart ring 102 of user 302. For example, wireless signal 706 used by device reader 704 of payment device 702 may be use NFC, RFID, Bluetooth, or other suitable short-range wireless communication technology to conduct electronic financial transaction 700 with smart ring 102 of user 302.

In some embodiments, a gesture or other intentional motion may be performed by user 302 while wearing smart ring 102 to affirm that user 302 wants to conduct electronic financial transaction 700. In this embodiment, user 302 performs a confirmation gesture 710 with the hand of user 302 that is wearing smart ring 102 to positively affirm that user 302 intends to conduct electronic financial transaction 700. For example, in this embodiment, user 302 performs gesture 710 to affirm payment of $100 to the merchant via electronic financial transaction 700. One or more of the sensors included in smart ring 102, such as accelerometer 114 and/or force sensor 115, may be used to detect gesture 710. As shown in FIG. 7, confirmation gesture 710 is turning over the hand of user 302 that is wearing smart ring 102. In other embodiments, however, gesture 710 may take other forms, including customized gestures chosen by the user. With this arrangement, confirmation gesture 710 may be used to prevent accidental or unwanted transactions with smart ring 102.

In other embodiments, another source or device may be used to provide an optional confirmation that user 302 intends to conduct electronic financial transaction 700. For example, in some embodiments, a mobile device (e.g., mobile device 202) or a smart watch or similar connected device may be used by user 302 to provide a confirmation to conduct electronic financial transaction 700 using smart ring 102.

Figure 8:
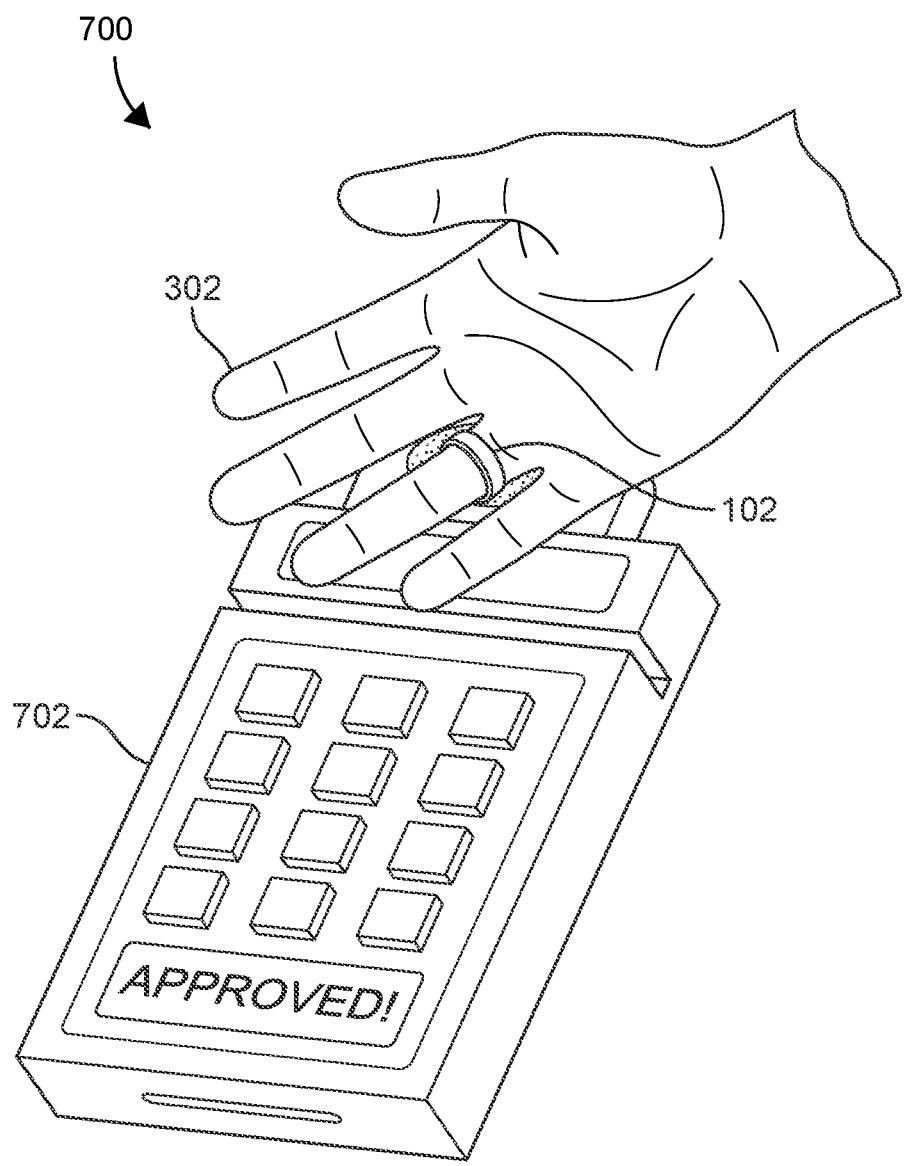
FIG. 8 is a representational view of an example embodiment of an electronic financial transaction using a wearable smart ring device.

As shown in FIG. 8, user 302 has completed electronic financial transaction 700 using wearable smart ring device 102. As described above, upon initiation of gesture 710 or by proximity of smart ring 102 with device reader 704 of payment device 702, user 302 has successfully conducted electronic financial transaction 700 to provide payment to the merchant or business for the goods or services purchased by user 302. According to the principles of the example embodiments described herein, user 302 may continue to use authenticated smart ring 102 to conduct additional electronic financial transactions after completion of electronic financial transaction 700 without requiring user 302 to re-authorize smart ring 102. This may continue for any period of time as long as user 302 continues to wear authenticated smart ring 102. With this arrangement, inconveniences to the user due to repeated authorizations can be minimized.

Figure 9:
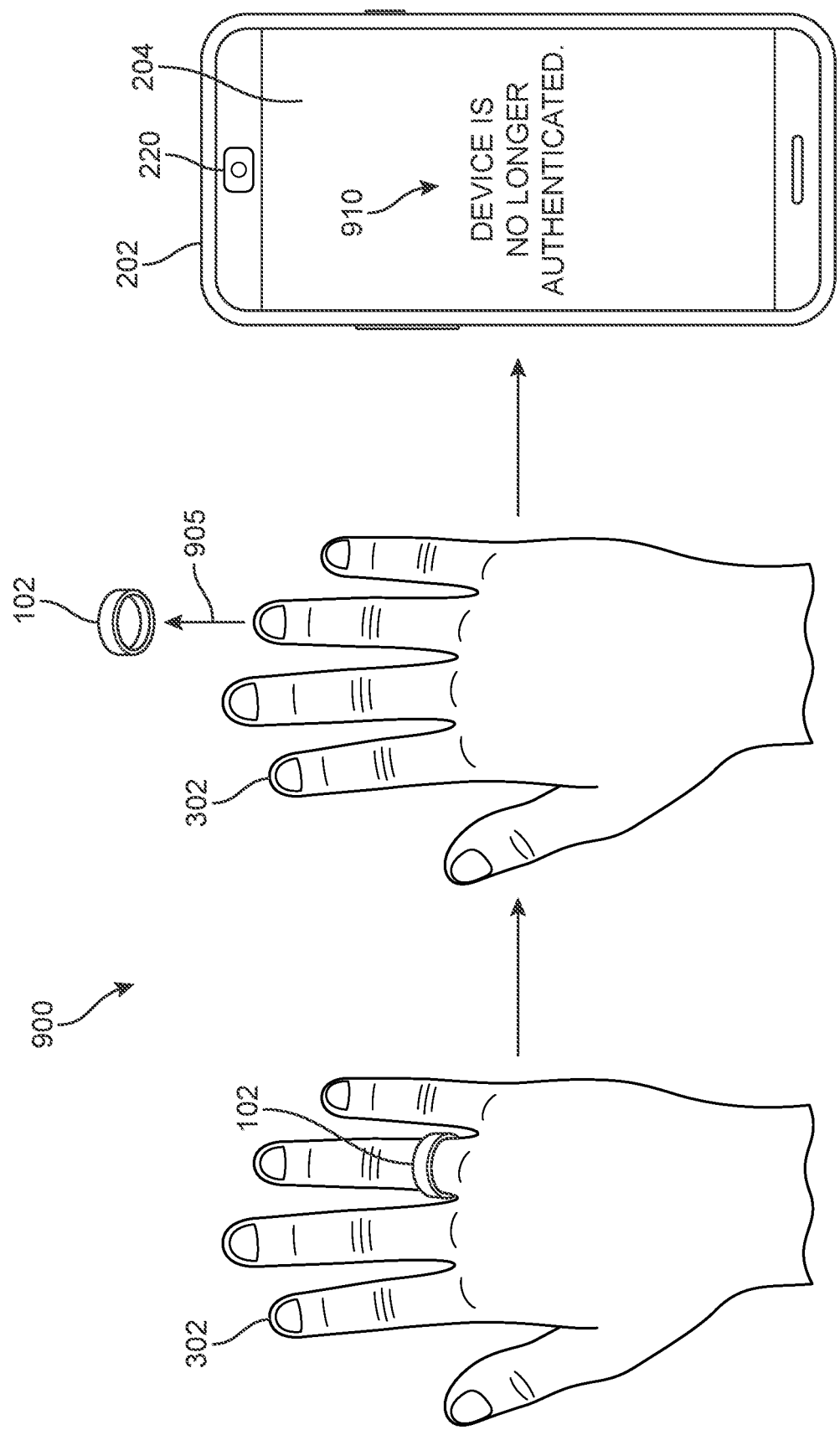
FIG. 9 is a representational view of an example embodiment of a wearable smart ring device that is no longer authenticated.

In some embodiments, a user may want to de-authorize the wearable smart ring device from conducting any further electronic financial transactions. Referring now to FIG. 9, an example embodiment of a de-authorization interaction 900 for wearable smart ring device 102 is shown. In this embodiment, user 302 is already wearing authorized smart ring 102, which has been authenticated as described above (e.g., according to authentication process 400, 600). De-authorization interaction 900 provides user 302 with a mechanism to remove the previous authorization of smart ring 102 so that smart ring 102 cannot be used for additional electronic financial transactions until it is re-authorized (e.g., according to authentication process 400, 600).

In this embodiment, de-authorization interaction 900 is performed by user 302 removing smart ring 102 from the finger of user 302. For example, as shown in FIG. 9, user 302 moves smart ring 102 in a second direction 905 (i.e., opposite of first direction 304, as shown in FIGS. 3 and 5) to take smart ring 102 off of the finger of user 302. In an example embodiment, mobile device 202 of user 302 may detect when smart ring 102 has been removed. As described above, one or more sensors of smart ring 102, for example, biometric sensor 120 or another sensor, such as a light sensitive or photocell sensor, may be used to detect when user 302 removes smart ring 102 from the user's finger.

In response to the removal of smart ring 102, mobile device 202 de-authorizes smart ring 102 so that smart ring 102 may no longer be used to conduct any further electronic financial transactions until it is re-authorized. In some embodiments, a de-authorization message 910 may be displayed on display 204 of mobile device 202 to inform user 302 that smart ring 102 has been successfully de-authorized as part of de-authorization interaction 900. With this arrangement, the user can receive confirmation that the wearable smart ring device cannot be used for any further electronic financial transactions until such time that the user re-authorizes the device.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A method for a one-time authentication interaction to conduct electronic financial transactions, the method comprising:
   performing an initial pairing between a mobile device and a wearable smart ring device using a short-range wireless communication technology;
   during a subsequent interaction after the initial pairing, detecting, by the mobile device, that the wearable smart ring device is being worn by a user;
   in response to detecting that the wearable smart ring device is being worn by the user, displaying an authentication option message on a display of the mobile device to provide the user with ability to authenticate the wearable smart ring device for conducting electronic financial transactions;
   upon receiving, by the mobile device, a selection to decline the authentication option, permitting functionalities of the wearable smart ring device without the ability to conduct electronic financial transactions;
   upon receiving, by the mobile device, a selection of the authentication option, receiving, by the mobile device, authentication information associated with the user;
   comparing, by the mobile device, the received authentication information with stored authentication information associated with the user;
   upon determining that the received authentication information matches the stored authentication information, authenticating the wearable smart ring device to conduct electronic financial transactions;
   upon initiating an electronic financial transaction at a payment terminal using the wearable smart ring device, using another wearable device in the form of a smart watch worn by the user to confirm that the user intends to conduct the electronic financial transaction using the wearable smart ring device; and
   upon detecting, by at least one biometric sensor of the wearable smart ring device, that the wearable smart ring device is removed from the finger of the user, de-authenticating the wearable smart ring device from conducting any electronic financial transactions.

2. The method according to claim 1, wherein the authentication information associated with the user includes stored biometric information associated with the user; and
   wherein the stored biometric information associated with the user is saved on the wearable smart ring device.

3. The method according to claim 1, wherein the at least one biometric sensor of the wearable smart ring device includes a light sensitive or photocell sensor; and
   wherein the light sensitive or photocell sensor detects when the wearable smart ring device is removed from the finger of the user.

4. The method according to claim 1, wherein the mobile device includes a camera; and
   wherein the authentication information associated with the user is received by the mobile device from the camera.

5. The method according to claim 1, wherein the wearable smart ring device remains authorized to conduct electronic financial transactions until taken off by the user.

6. The method according to claim 1, wherein the authentication information includes at least two forms of authentication.

7. The method according to claim 1, wherein the wearable smart ring device includes at least one of an accelerometer or a force sensor; and wherein the authentication information includes a gesture-based authentication recognized by the at least one of an accelerometer or a force sensor.

8. A method for conducting electronic financial transactions using a wearable smart ring device, the method comprising:

performing an initial pairing between a mobile device and the wearable smart ring device using a short-range wireless communication technology;

during a subsequent interaction after the initial pairing, detecting, by the mobile device, that the wearable smart ring device is being worn by a user;

in response to detecting that the wearable smart ring device is being worn by the user, displaying an authentication option message on a display of the mobile device to provide the user with ability to authenticate the wearable smart ring device for conducting electronic financial transactions;

upon receiving, by the mobile device, a selection to decline the authentication option, permitting functionalities of the wearable smart ring device without the ability to conduct electronic financial transactions;

upon receiving, by the mobile device, a selection of the authentication option, receiving, by the mobile device in communication with the wearable smart ring device, authentication information associated with a user of the wearable smart ring device;

upon determining that the received authentication information matches stored authentication information for the user, authenticating, by the mobile device, the wearable smart ring device for conducting electronic financial transactions;

using the wearable smart ring device to conduct one or more electronic financial transactions at one or more payment terminals, wherein the wearable smart ring device remains authenticated for conducting subsequent electronic financial transactions until the wearable smart ring device is de-authenticated by being removed from the finger of the user;

upon initiating an electronic financial transaction at a payment terminal using the wearable smart ring device, using another wearable device in the form of a smart watch worn by the user to confirm that the user intends to conduct the electronic financial transaction using the wearable smart ring device; and wherein determining that the wearable smart ring device is removed from the finger of the user comprises:

detecting, using at least one biometric sensor disposed on a portion of an inside surface of the wearable smart ring device, that the wearable smart ring device has been removed from the finger of the user.

9. The method according to claim 8, wherein the authentication information includes biometric information associated with the user.

10. The method according to claim 8, wherein the authentication information includes at least two forms of authentication.

11. The method according to claim 8, wherein the authentication information includes facial recognition using a camera of the mobile device.

12. The method according to claim 8, further comprising: upon initiating the electronic financial transaction at the payment terminal, performing a confirmation gesture with the wearable smart ring device to affirm the electronic financial transaction.

13. The method according to claim 12, wherein the confirmation gesture is sensed using at least one of an accelerometer or a force sensor of the wearable smart ring device.

14. The method according to claim 8, wherein the at least one biometric sensor of the wearable smart ring device includes a light sensitive or photocell sensor configured to detect when the wearable smart ring device is taken off the finger of the user.

15. The method according to claim 8, further comprising using the mobile device in communication with the wearable smart ring device to confirm the electronic financial transaction.

16. A system for conducting electronic financial transactions using a wearable smart ring device, the system comprising:

a wearable smart ring device including at least one of a near-field communication (NFC) sensor or a radio frequency identification (RFID) sensor, a short-range communication sensor, and at least one biometric sensor, the at least one biometric sensor being disposed on an inside surface of the wearable smart ring device;

a mobile device including a communication module configured to permit the mobile device to communicate with the short-range communication sensor of the wearable smart ring device; and another wearable device in the form of a smart watch worn by the user;

wherein the mobile device is configured to:

perform an initial pairing between the mobile device and the wearable smart ring device using a short-range wireless communication technology;

during a subsequent interaction after the initial pairing, detect that the wearable smart ring device is being worn by a user;

in response to detecting that the wearable smart ring device is being worn by the user, display an authentication option message on a display of the mobile device to provide the user with ability to authenticate the wearable smart ring device for conducting electronic financial transactions;

upon receiving a selection to decline the authentication option, permit functionalities of the wearable smart ring device without the ability to conduct electronic financial transactions;

upon receiving a selection of the authentication option, receive authentication information associated with the user of the wearable smart ring device to authenticate the wearable smart ring device for conducting electronic financial transactions at one or more payment terminals; and wherein, upon initiating an electronic financial transaction at a payment terminal using the wearable smart ring device, the smart watch worn by the user is configured to confirm that the user intends to conduct the electronic financial transaction using the wearable smart ring device;

wherein the wearable smart ring device remains authenticated for conducting subsequent electronic financial transactions until the wearable smart ring device is de-authenticated by using the at least one biometric sensor to detect that the wearable smart ring device has been removed from the finger of the user.

17. The system according to claim 16, wherein the authentication information received by the mobile device is biometric information associated with the user from the at least one biometric sensor of the wearable smart ring device obtained during a biometric reading performed when the wearable smart ring device is placed onto a finger of the user; and wherein stored biometric information associated with the user is saved on at least one of the wearable smart ring device or the mobile device and is configured to be compared with the biometric information received by the mobile device to authenticate the wearable smart ring device.

18. The system according to claim 16, wherein the mobile device includes a camera; and wherein the authentication information associated with the user is received by the mobile device from the camera.

19. The system according to claim 16, wherein the authentication information includes at least two forms of authentication.

20. The system according to claim 16, wherein the wearable smart ring device includes at least one of an accelerometer or a force sensor; and wherein the at least one of the accelerometer or the force sensor is configured to recognize a confirmation gesture made by the user to affirm an electronic financial transaction at the one or more payment terminals.

* * * * *